Patented Oct. 14, 1947

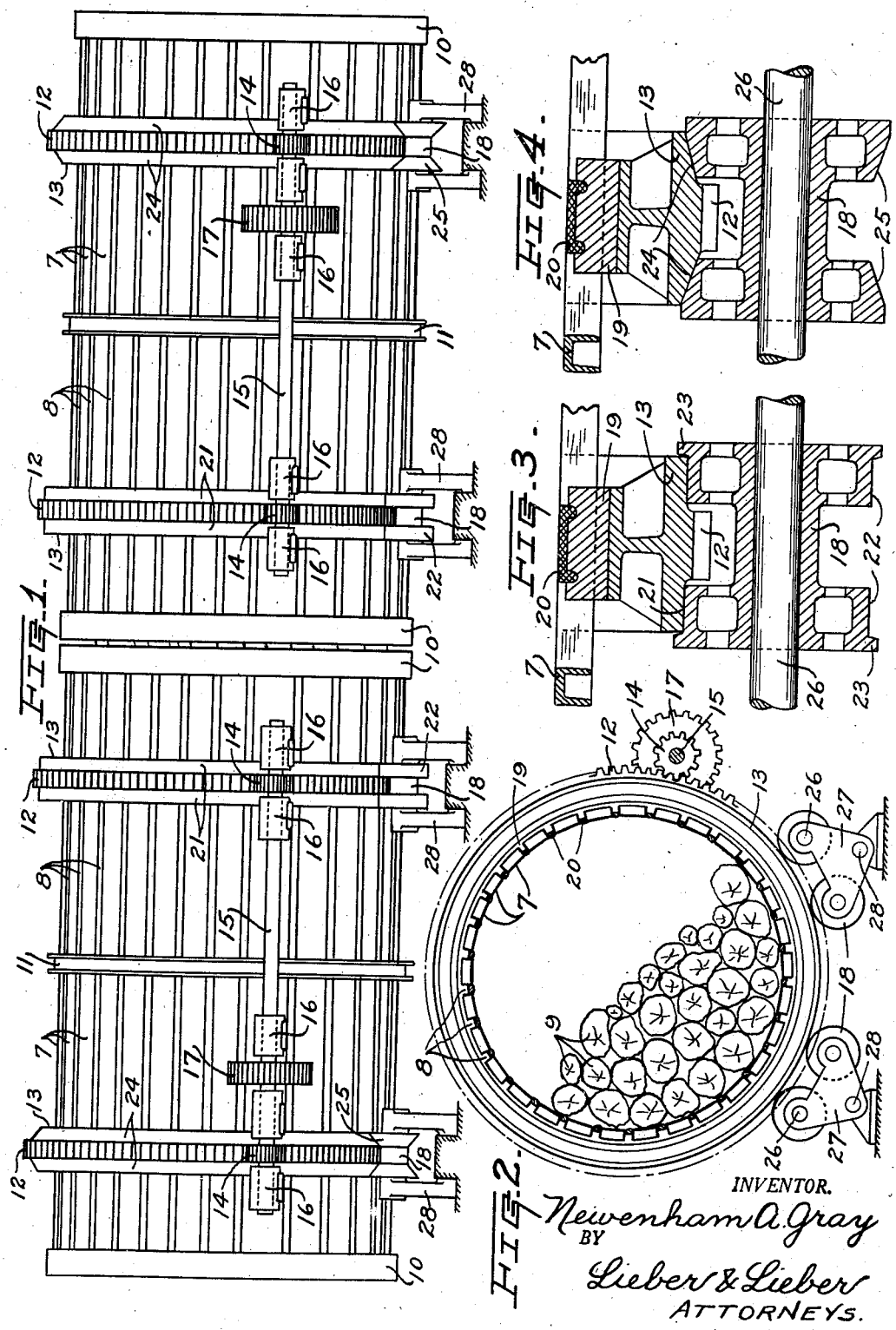

2,428,967

UNITED STATES PATENT OFFICE 2,428,967

BARKING DRUM DRIVE

Newenham A. Gray, Wausau, Wis., assignor to D. J. Murray Manufacturing Co., Wausau, Wis., a corporation of Wisconsin Application December 27, 1944, Serial No. 569,939

7 Claims. (Cl. 144—208)

This invention relates in general to improvements in the art of removing bark from logs, and relates more specifically to an improved system of supporting and operating so-called barking drums wherein the bark is removed by tumbling and cascading masses of logs over each other.

The primary object of my invention is to provide an improved mode of mounting and driving a barking drum of the type having an annular series of elongated bars surrounded and interconnected by a plurality of annular retaining elements, in order to relieve the bars and elements from undue stresses and strains.

It has heretofore been customary in the paper manufacturing industry to debark logs which were subsequently used in the production of the fibrous pulp, by rumbling groups of the logs in a rotary barking drum comprising an annular series of long flat bars embraced by and attached to a series of concentric annular elements such as retainer rings, tires, and a driving gear. In the past, each of these barking drums ordinarily embodied parallel channel bars which were spaced apart so as to provide openings between the successive bars, and the opposite ends of the bars were secured to end rings while the mid-portions thereof were connected to a single annular bull gear and the portions on the opposite sides of the gear and between the latter and the end rings were attached to annular supporting tires which coacted with sets of suitable supporting rollers, as clearly shown in pending application Serial No. 552,675, filed September 4, 1944. The bars were preferably welded to their confining rings, gear, and tires, and the drum units were sometimes used in alined sets of two or more rotatable about a common axis by means of driving pinions coacting with the bull gears of the units and which were driven from any suitable power source.

Considerable difficulty has been encountered in the commercial operation of such barking drum units, by virtue of the fact that the driving power was applied to each drum through a central driving gear attached directly to the component bars, and was transmitted through portions of these bars to the supporting tires located remote from the driving gear, thus causing the bars to deflect and vibrate under varying load conditions and eventually producing breakage of the bars and of the fastenings between the bars and their confining rings, tires and gears. This destructive deflection of the bars was augmented by the central loading of the drums and by the relatively heavy weight of the driving gear, as well as by the torque imposed upon the bars themselves; and eventually destroyed the drums especially in cases where the bars were welded to the adjacent confining elements and thus produced rigid connections. I have discovered that such destructive effects may be substantially eliminated or at least greatly reduced, by avoiding transmission of driving power through the bars from one ring element to another, as from the bull gear to the tires, and that this may be readily accomplished by applying the drum rotating power directly to one or more of the tires or other annular supports.

It is therefore a more specific object of the present invention, to provide an improved driving and supporting assemblage for a drum comprising an annular series of parallel bars embraced and interconnected by a series of rings, whereby rotation may be most effectively imparted to the drum without detrimentally affecting the connections between the rings and bars.

Another specific object of my invention is to provide an improved driving system for a rotary drum formed of an annulus of elongated bars, whereby undesirable deflection and vibration of the bars due to loading, impact and power application, are reduced to a minimum, and in which the life of the drum structure is enhanced to a maximum.

A further specific object of this invention is to provide an improved drive for a barking drum unit or the like, wherein the power is most effectively applied to the drum bars, and in which the unit is also most effectively supported for free rotation.

Still another specific object of the invention is to provide an improved system for driving two or more concentric barking drum units simultaneously but at differential speeds, so that the logs being treated are subjected to maximum abrasive or rubbing action without being excessively splintered or otherwise disintegrated.

These and other specific objects and advantages of the invention will be apparent from the following detailed description.

Fig. 1 is a somewhat diagrammatic side elevation of a pair of concentric rotary barking drum units, having the improved supporting and driving system applied thereto;

Fig. 2 is a similarly diagrammatic transverse section through one of the rotary barking drum units, showing the mode of supporting and driving the drum;

Fig. 3 is an enlarged fragmentary section through one of the supporting rollers for the rotary drum, and through a portion of an adjacent driving gear and cylindrical tire assemblage; and Fig. 4 is a similarly enlarged fragmentary section through the supporting roller, driving gear and tire assemblage, but showing frustro-conical coacting roller and tire surfaces.

While the present invention has special utility when applied to rotary barking drum units each having an annular series of parallel bars welded to surrounding rings, it is not my desire or intention to unnecessarily restrict the scope or utility of the improved features for use in connection with other slotted or perforated drum structures.

Referring to the drawing, each of the improved barking drum units comprises primarily an annular series of elongated parallel slats or flat bars 7 separated by intervening spaces 8 and adapted to receive successive batches or groups of logs 9; a pair of end rings 10 firmly secured to the opposite extreme ends of the bars 7 in any suitable manner; a central retainer ring 11 embracing the mid-portions of the bars 7 and also being firmly secured thereto; a combined annular driving or bull gear 12 and tire-ring 13 firmly secured to the bar annulus between the central ring 11 and each end ring 10; a driving pinion 14 coacting with each of the ring gears 12 and both being mounted upon a common counter shaft 15 supported in bearings 16; means such as a gear 17 for rotating the countershaft 15 at any desired speed; and several pairs of swingably suspended rollers 18 coacting with each tire-ring 13.

The elongated slats or bars 7 are preferably formed of channel stock and have their side flanges fitted within successive recesses formed in assembly rings 19 and rigidly secured thereto by welds 20, as shown in Figs. 2, 3 and 4 and in the copending application above referred to; and the assembly rings 19 may be firmly attached to the adjacent tire-rings 13 in any suitable manner as by bolting or welding. These assembly rings 19 are used only at the supporting and driving zones, and the end rings 10 and the central ring 11 may be formed in a manner similar to that of the rings 19, and also serve to facilitate assembly of the bars 7 and to subsequently maintain these bars in proper position. The successive slots or spaces 8 which separate the adjacent bars 7, function to permit the removed bark and other debris to escape from the rotating drum assemblages by gravity, and the diameter and length of each drum may be made to suit the particular class of work which is to be performed.

The annular driving gears 12 and the tire-rings 13 may be formed separate or integral as shown, and the tire-rings 13 may also be of several types as illustrated. In the type specifically shown in Fig. 3, the peripheral bearing surfaces 21 of the ring 13, located directly on opposite sides of the bull gear 12, are cylindrical, and are caused to coact with supporting rollers 18 also having cylindrical bearing surfaces 22 and provided with end flanges 23 spaced apart sufficiently to permit slight floating of the cylindrical tires longitudinally of their axes. In the embodiment specifically shown in Fig. 4, the peripheral bearing surfaces 24 of the ring 13, which are likewise located directly on opposite sides of the bull gear 12, are frustro-conical in shape, and are caused to coact with modified supporting rollers 18 having frustro-conical or tapered bearing surfaces 25, but no end flanges. While the cylindrical type of tire may permit slight lateral floating of the intervening ring gear 12, the frustro-conical or tapered type of tire prevents axial displacement of the driving gear associated therewith; and either or both types of these tires may be utilized in conjunction with the same barking drum. By employing one of each type of tire-ring 13 on each drum unit, as shown in Fig. 1, the conical tires will hold one end portion of the drum against axial displacement, while the opposite end of the drum assemblage will be free to shift axially so as to accommodate any slight expansion and contraction of the elongated bars 7.

The supporting rollers 18 are mounted upon shafts 26 which are journalled in brackets 27, and these brackets are swingably suspended from pivot pins 28 in a well known manner. A pair of rollers 18 is thus carried by each swingable bracket 27, and this arrangement permits the rollers 18 to properly engage the adjacent tire-rings 13 even if slight irregularities should develop in the tires or in the bracket supports. The counter shaft bearings 16 may be mounted upon any suitable support, and motion may be imparted to the driving gears 17 from an electric motor or the like through suitable speed reducing gearing, so that the barking drums may normally be revolved through the pinions 14 and gears 12 at any desired speed. While the barking drum units may be utilized individually, they may also be operated in alined pairs or multiple, as shown in Fig. 1, and in such cases it is desirable to actuate the adjacent drums at differential speeds. This result may readily be accomplished by forming the driving gears 17 of the successive units, of different diameters as illustrated in Fig. 1, so that one of the cooperating drums will rotate faster or slower than the other. Such differential speed of rotation will cause the logs 9 passing from one drum into the adjacent drum, to become dislodged from normal approximately parallel disposition, and will tend to twist the cascading or tumbling mass thus enhancing the rubbing and bark removing action.

During normal operation of the improved barking drum drive, the drum units after having been properly assembled may be utilized either singly or in multiple, and may be mounted either with their longitudinal axes horizontal or slightly inclined. The drums are normally constantly rotated in either direction, by application of power to the driving gears 17, and as the masses of logs 9 are fed through the revolving drums, the logs will tumble and cascade over each other, thereby causing the bark to be removed by impact and abrasion. The removed bark is broken up into smaller pieces by the rumbling action of the logs, and most of the disintegrated bark is subsequently delivered from the interiors of the drums through the spaces 8 formed between the successive bars of the drums. The logs 9 after having the bark thus removed, are eventually delivered from the discharge ends of the drums, and in cases where the drums are used in coaxial pairs or multiples, the logs are passed successively through the cooperating coaxial drums. In cases where the drums are revolved at differential speeds by utilizing the driving gears 17 of different diameters, the impact and abrasive action on the logs is enhanced, as the logs pass from one drum to the next succeeding drum, by virtue of the twisting of the log charges due to the differential speed of the adjoining drums. It should be noted that by applying the power to the drums at spaced zones or bull gears 12, and by associating these ring gears directly with the supporting tires 13, and by furthermore simultaneously revolving the ring gears 12 at the same speeds, twisting of the bars 7 intermediate their ends is definitely avoided. The combination of the driving bull gears 12 with the tire-rings 13, furthermore prevents the weight of these relatively heavy bull gears from undesirably deflecting the elongated bars 7 intermediate their ends, thus thoroughly protecting the fastenings between the bars 7 and the tire-rings 13 against disruption due to torsional stresses and also eliminating destructive vibrations which ordinarily result from deflection of the bars 7.

From the foregoing detailed description it will be apparent that my present invention provides an improved drive especially adaptable to barking drums or the like formed of annular series of laterally spaced parallel bars, which is not only simple in construction, but which is also highly effective in use and thoroughly protects the joints between the bars and their retaining rings against destructive influences. The improved drive will obviously prolong the life of the barking drum units to a maximum by relieving the fasteners between the bars and their supporting rings from undesirable stresses and strains, and by operating the drum units in multiples and at differential speeds, the debarking action may be materially enhanced without complicating the assemblage. The provision of tire-rings having cylindrical and conical surfaces, permits most effective supporting of the drums during revolution thereof, and by providing both types of tire-rings in the same unit, expansion and contraction of the drum bars 7 may be automatically compensated for without danger of having the drums undesirably displaced along their axes. The conical tires will provide an anchoring zone for each drum, while the cylindrical tires will permit slight axial movement due to expansion and contraction of the bars, and while the improved drive may be advantageously applied to drums having perforations or slots formed in any manner, it is especially useful in conjunction with revolving drums constructed of annular series or bars locally attached to assembly and retaining rings. It is also noteworthy, that the tire rings 13 which are associated directly with the bull gears 12, need not necessarily project from both of the opposite sides of these gears, and it is within the contemplation of the present improvement to cause these tire rings to extend solely from one side of the annular driving gears with which they are directly associated, and this applies to both the conical and cylindrical type of tire.

It should be understood that it is not desired to limit this invention to the exact details of construction or to the precise mode of operation, herein shown and described, for various modifications within the scope of the appended claims may occur to persons skilled in the art.

I claim:

1. In a barking drum, an annular series of parallel bars, a combined gear and tire assemblage embracing and locally welded to said bars near each of the opposite end portions of said series, each of said assemblages comprising an annular gear having supporting tire sections directly adjoining the opposite sides thereof, supporting rollers coacting with said tire sections, the tire sections and rollers of one set having cylindrical surfaces of coaction and the tire sections and rollers of the other set having frustro-conical surfaces of coaction, and a driving pinion coacting with each of said gears.

2. In a barking drum, an annular series of parallel bars, a combined gear and tire assemblage embracing and locally welded to said bars near each of the opposite end portions of said series, each of said assemblages comprising an annular gear having supporting tire sections directly adjoining the opposite sides thereof, supporting rollers coacting with said tire sections, the tire sections and rollers of one set having cylindrical surfaces of coaction and the tire sections and rollers of the other set having frustro-conical surfaces of coaction, a driving pinion coacting with each of said annular gears, and means for simultaneously rotating said pinions at the same speed.

3. In a barking drum, an annular series of elongated bars, a combined gear and tire assemblage embracing and locally attached to said bars near each of the opposite end portions of said series, each of said assemblages comprising an annular gear having a supporting tire directly adjoining each of the opposite sides thereof, supporting rollers coacting with said tires, the tires and rollers of one set having cylindrical surfaces of coaction and the tires and rollers of the other set having frustro-conical surfaces of coaction, and a driving pinion coacting with each of said gears.

4. In a barking drum, an annular series of elongated bars, a combined gear and tire assemblage embracing and locally attached to said bars near each of the opposite end portions of said series, each of said assemblages comprising an annular gear having a supporting tire directly adjoining each of the opposite sides thereof, supporting rollers coacting with said tires, the tires and rollers of one set having cylindrical surfaces of coaction and the tires and rollers of the other set having frustro-conical surfaces of coaction, a driving pinion coacting with each of said annular gears, and means for simultaneously rotating said pinions at the same speed.

5. In a barking drum, two coaxial annular series of elongated parallel bars, a combined gear and tire assemblage embracing and locally attached to the bars of each series near each of the opposite end portions thereof, each of said assemblages comprising an annular gear having a supporting tire directly adjoining each of the opposite sides thereof, supporting rollers coacting with said tires, one of said assemblages and the coacting rollers of each bar series having cylindrical surfaces of coaction and the other assemblage and coacting rollers of the same bar series having frustro-conical surfaces of coaction, and a driving pinion coacting with each of said gears.

6. In a barking drum, two coaxial annular series of elongated parallel bars, a combined gear and tire assemblage embracing and locally attached to the bars of each series near each of the opposite end portions thereof, each of said assemblages comprising an annular gear having a supporting tire directly adjoining each of the opposite sides thereof, supporting rollers coacting with said tires, one of said assemblages and the coacting rollers of each bar series having cylindrical surfaces of coaction and the other assemblage and coacting rollers of the same bar series having frustro-conical surfaces of coaction, a driving pinion coacting with each of said gears, and means for simultaneously revolving said two-bar series through said pinions thereof at differential speeds.

7. In a barking drum, an annular series of elongated bars, a ring secured to each of the opposite extreme ends of said series, a combined gear and tire assemblage embracing and attached to said bar series near each of said rings, each of said assemblages comprising an annular gear having a supporting tire adjoining each of the opposite sides thereof, supporting rollers coacting with said tires, one of said assemblages and the coacting rollers having cylindrical surfaces of coaction formed to permit relative movement along the drum axis and the other of said assemblages and the coacting rollers having frustro-conical surfaces of coaction formed to positively prevent such relative movement during longitudinal expansion and contraction of said bars, and a driving pinion coacting with each of said gears.

NEWENHAM A. GRAY.

REFERENCES CITED

The following references are of record in the file of this patent:

UNITED STATES PATENTS

| Number    | Name      | Date          |
|-----------|-----------|---------------|
| 655,745   | Walker    | Aug. 14, 1900 |
| 1,120,631 | Schenck   | Dec. 8, 1914  |
| 1,194,872 | Paulson   | Aug. 15, 1916 |
| 1,333,734 | Rocic     | Mar. 16, 1920 |
| 1,667,996 | Westbye   | May 1, 1928   |
| 1,672,300 | Branch    | June 5, 1928  |
| 2,208,004 | Koebke    | July 16, 1940 |
| 615,519   | Barr      | Dec. 6, 1896  |
| 532,629   | Bacon     | Jan. 15, 1895 |
| 1,163,245 | McCone    | Dec. 7, 1915  |
| 1,536,491 | Gunderoth | May 5, 1925   |